(12) United States Patent
Cook et al.

(10) Patent No.: US 7,946,023 B2
(45) Date of Patent: May 24, 2011

(54) METHOD AND APPARATUS FOR MEASURING COMPRESSION IN A STATOR CORE

(75) Inventors: James Allan Cook, Orlando, FL (US); David T. Allen, Longwood, FL (US)

(73) Assignee: Siemens Energy, Inc., Orlando, FL (US)

( * ) Notice: Subject to any disclaimer, the term of this patent is extended or adjusted under 35 U.S.C. 154(b) by 312 days.

(21) Appl. No.: 11/285,834

(22) Filed: Nov. 22, 2005

(65) Prior Publication Data

US 2007/0113672 A1    May 24, 2007

(51) Int. Cl.
*H02K 15/00* (2006.01)
*H01F 3/04* (2006.01)
*G01R 31/28* (2006.01)

(52) U.S. Cl. ............... 29/596; 29/609; 29/593; 29/732
(58) Field of Classification Search .................. 29/596, 29/609, 593, 732
See application file for complete search history.

(56) References Cited

U.S. PATENT DOCUMENTS

| | | | | |
|---|---|---|---|---|
| 2,604,037 | A * | 7/1952 | Pearce | 100/269.11 |
| 3,994,071 | A * | 11/1976 | Schoffel | 33/832 |
| 4,006,678 | A * | 2/1977 | Laurie et al. | 100/1 |
| 4,438,364 | A * | 3/1984 | Morison | 310/328 |
| 4,457,684 | A * | 7/1984 | Gram | 425/451.9 |
| 4,638,199 | A * | 1/1987 | Brem et al. | 310/91 |
| 4,665,818 | A * | 5/1987 | Held | 100/154 |
| 4,785,693 | A * | 11/1988 | Minamiyama et al. | 81/465 |
| 5,059,321 | A * | 10/1991 | Bahr | 210/386 |
| 5,875,540 | A * | 3/1999 | Sargeant et al. | 29/596 |
| 5,994,804 | A * | 11/1999 | Grennan et al. | 310/60 R |
| 5,995,361 | A * | 11/1999 | Jayaraj et al. | 361/511 |
| 6,489,760 | B2 * | 12/2002 | Kim et al. | 324/207.18 |
| 6,653,577 | B2 * | 11/2003 | Breed et al. | 177/144 |
| 6,677,673 | B1 * | 1/2004 | Hitchcock | 257/718 |
| 6,682,576 | B1 * | 1/2004 | Kiyotani et al. | 55/486 |
| 6,713,535 | B2 * | 3/2004 | Orkin et al. | 523/428 |
| 6,772,682 | B1 * | 8/2004 | Daniel et al. | 100/347 |
| 6,877,430 | B2 * | 4/2005 | Muller et al. | 101/490 |
| 6,902,502 | B2 * | 6/2005 | Murakami et al. | 474/23 |
| 6,936,362 | B2 * | 8/2005 | Chapman et al. | 429/13 |
| 7,127,939 | B2 * | 10/2006 | Irmer et al. | 73/116 |
| 7,152,444 | B2 * | 12/2006 | Matsumoto et al. | 72/17.2 |

* cited by examiner

Primary Examiner — A. Dexter Tugbang
Assistant Examiner — David P Angwin

(57) ABSTRACT

The present invention a method and apparatus for measuring the compression of a stator core 10 that comprises attaching a measuring device 22 to a tensioner 20, placing the tensioner on an end of a through-bolt 12 of the stator core, and performing at least one act of tensioning the stator core 10 with the tensioner. Then measuring a compression state of the stator core by the measuring device registers determining the amount of relative compression achieved by the act of tensioning, the relative compression is the amount of actual compression of the core and the amount of stretch of the through-bolt. Finally determining an actual compression state of the stator core based on the measuring.

12 Claims, 2 Drawing Sheets

METHOD AND APPARATUS FOR MEASURING COMPRESSION IN A STATOR CORE

FIELD OF THE INVENTION

The field of the invention relates to power generators, and more specifically to measuring compression in stator cores.

BACKGROUND

The generator stator core is the largest component in the train of a turbine generator set. The stator cores are generally manufactured from thousands of laminations of relatively thin steel plates which are stacked, pressed and clamped together into the large cylindrical form of the stator core. Typically, the stator core is assembled from the steel plates directly at the final installation site. However, the large size of the stator core and the need for proper clamping results in stator core manufacturing difficulties, including generous floor space and high crane requirements. U.S. Pat. No. 5,875,540 by Sargeant, which is incorporated herein by reference, overcame some of the problems with the prior art by first assembling a number of laminations into a distinct set, referred to as a donut, and then stacking these donuts to form a stator core. This saved great amounts of time over assembling the laminations individually, and produced a stator core with less flaws. When the individual laminations, or the set of laminations in a donut, are installed into a core, they engage what are referred to as keybars. Keybars are essentially rods that run the internal length of the stator core and provide a hook-in spot for the laminations. Laminations are inserted within the stator frame, engaging keybars and are stacked together to form the stator core. An end-on view is shown in FIG. 1 of a stator core 10. Since it is assembled, the laminations that make up the core are not separately discernable from this perspective. The core is held to its frame (not shown) by keybars 6, but the core itself is held together by through-bolts 12, which are literally long metal bolts that extend through the length of the core, keeping all of the laminations together.

Both during initial assembly and during maintenance, the stator core needs to be compressed. This is typically accomplished via hydraulic tensioners that are attached to the ends of through-bolts. The hydraulic tensioners press the laminations of the core, while pulling on the through-bolt. This is then repeated several times. Often a tensioner is placed on every through-bolt, though sometimes a strategic placement of tensioners is used at less-than every through-bolt.

Determining how much the core has compressed, however, is still difficult and is usually left to the experience of the technician compressing the core. A knife test, which is attempting to insert a thin knife between laminations, is common practice in the field to test compression. In some cases linear voltage differential transformers (LVDTs) are used. An LVDT can measure movement as little as fractions of an inch or centimeter. The body of an LVDT is typically mounted to a fixed point, while the plunger maintains contact on an object to measure the displacement. The LVDTs are mounted on the keybars or frame, on both sides of the core, to measure how much the core is being compressed. Adjusting measurements to account for deflections in the frame, where the LVDT is mounted, is difficult and reduces the accuracy.

What is needed therefore is a method of measuring the compression in a stator core that is easy to use and accurate.

Other difficulties with the prior art also exist, some of which will be apparent upon further reading.

SUMMARY OF THE INVENTION

With the foregoing in mind, methods and apparatuses consistent with the present invention, which inter alia facilitates the measuring of compression in a stator core. By placing a measuring device, such as an LVDT to a stator core tensioner, the amount of relative compression achieved is measured. The relative compression being essentially the amount of compression and the amount of stretch caused by the tensioner. This relative amount of compression can be used to gauge compression, or calculations can be performed to convert the relative compression measurement into actual compression.

These and other objects, features, and advantages in accordance with the present invention are provided particular embodiments by a method for measuring the compression of a stator core that comprises attaching a measuring device to a tensioner, placing the tensioner on an end of a through-bolt of the stator core, and performing at least one act of tensioning the stator core with the tensioner. Then measuring a compression state of the stator core by the measuring device determining the amount of relative compression achieved by the one act of tensioning, the relative compression is the amount of actual compression of the core and the amount of stretch of the through-bolt. Finally determining an actual compression state of the stator core based on the measuring.

In a related embodiment determining an actual compression state is performed by comparing the amount of relative compression to a pre-determined norm. Or determining an actual compression state is performed by obtaining further measurements to predict an optimal compression state and comparing the optimal compression state to the measurements. Or determining an actual compression state is performed by subtracting the stretch of the through-bolt from the measurement.

In another related embodiment the acts of tensioning and measuring may be performed multiple times. Also multiple measuring devices may be used, for example 4-8 measuring devices may be used per stator core. In particular embodiments the measuring device is an LVDT, and the tensioner is a hydraulic tensioner.

In another embodiment the present invention provides for a method for measuring the compression of a stator core that comprises attaching a LVDT measuring device to a hydraulic tensioner, placing the hydraulic tensioner on an end of a through-bolt of the stator core, and performing a series of tensioning steps to compress the stator core. Then measuring a relative compression of the stator core at each of the tensioning steps, the relative compression is the amount of actual compression of the core and the amount of stretch of the through-bolt. Finally then determining when the amount of relative compression has diminished and adjusting the number of steps in the tensioning steps.

In still another embodiment the present invention provides for an apparatus for determining the compression of a stator core, that comprises a through-bolt, where the through-bolt is part of the stator core, a tensioner, where the tensioner is attached to the through-bolt, and a measuring device, where the measuring device is mounted to the through-bolt and in intimate contact with the stator core. The measuring device measures a relative compression of the stator core, the relative compression is the amount of actual compression of the core and the amount of stretch of the through-bolt. In related embodiments the tension is a hydraulic tensioner, and the measuring device is an LVDT.

Other embodiments of the present invention also exist, which will be apparent upon further reading of the detailed description.

BRIEF DESCRIPTION OF THE FIGURES

The invention is explained in more detail by way of example with reference to the following drawings.

DETAILED DESCRIPTION OF THE INVENTION

The present invention provides for a method and apparatus for measuring compression of a stator core. This may be used to check the compression of pre-existing cores, or be used to measure when adequate compression is reached on newly assembled cores. Previously, measuring the compression of a stator core relied heavily on the experience of the technician, and often had to be roughly estimated. By use of the present invention, the compression of the stator core may be measured with greater accuracy, and may be done on pre-existing cores or newly assembled ones.

The present invention places a displacement measuring device, such as a linear voltage differential transformer (LVDT) onto a tensioner that fits directly over the ends of the core's through-bolts. Tensioners, such as the standard hydraulic tensioner, fit over the ends of the through-bolts, which are essentially rods ending in nuts and washers. The tensioners pull on the through-bolts while also pushing against the rest of core. This process is repeated multiple times for each through-bolt in the core.

By placing the measuring device on the tensioner, the measuring device not only measures the amount of compression, but also the amount of stretch in the through-bolt. This, however, can be compensated for by either knowing or calculating the stretch of the through-bolt and subtracting it from the overall measurement. The following equation may be used:

$$dXc = (X2 - X1) - ((dP * Ah) / ((Ab * E) / L))$$

$$dXc = (X2 - X1) - \frac{dP * Ah}{\left[\frac{Ab * E}{L}\right]}$$

Where dXc is the change in axial length of the core, X2 Is the displacement measurement after tension is applied, X1 is the displacement measurement before tension is applied, dP is the change in hydraulic pressure, Ah is the hydraulic cylinder active area, Ab is the cross sectional area of the through-bolt, E is the elastic modulus of the through-bolt, and L is the effective length of the through-bolt. Preferably measurement equations are pre-programmed into a computer so that just the actual compression is presented to a user without the need of further calculations.

Figure 1:
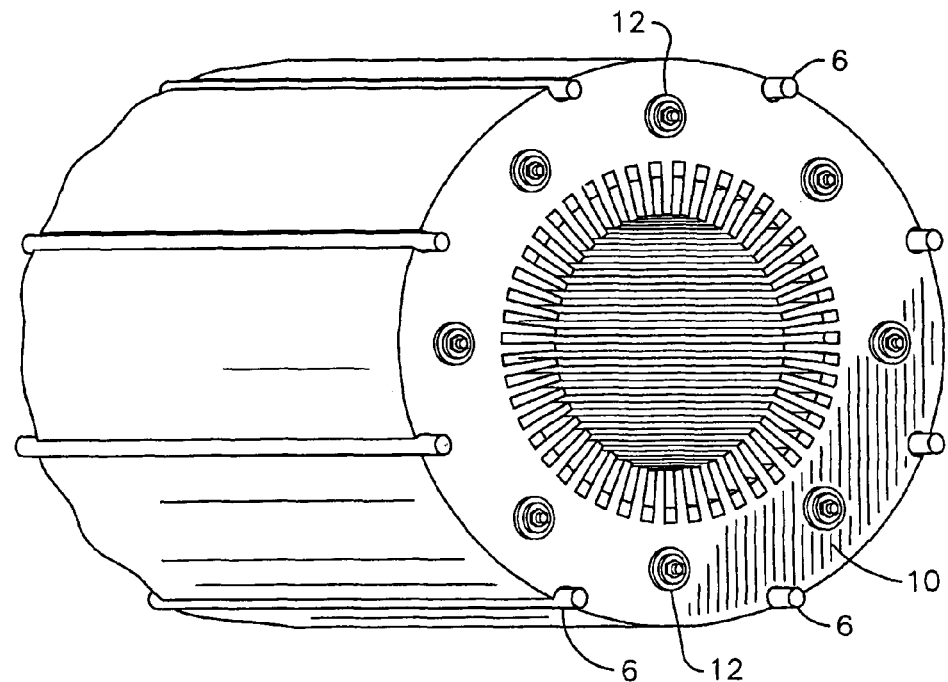
FIG. 1 illustrates an end-on view of a stator core.
Figure 2:
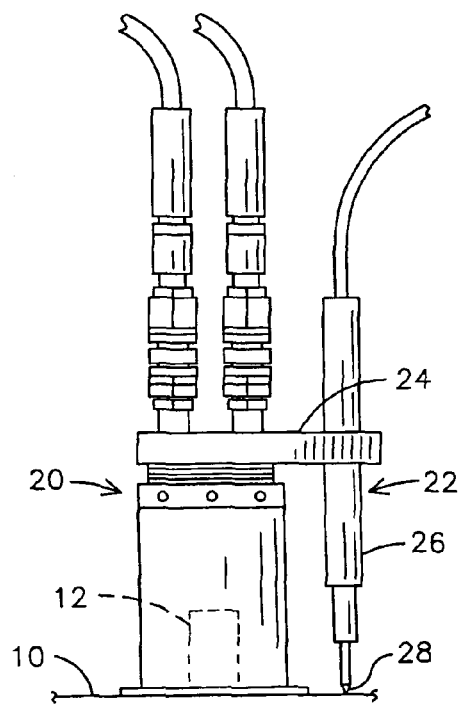
FIG. 2 illustrates a side view of one embodiment of the present invention.

FIG. 2 illustrates one example of the present invention. In this embodiment an LVDT 22 is attached to a hydraulic tensioner 20, that has been placed over the end of a through-bolt 12. In this embodiment the LVDT 26 is attached to the tensioner by means of a mounting block 24. The LVDT comprises a plunger 26 and tip 28, where the tip touches either the body of the core 10, or an object in intimate contact with the core, such as an end-plate or core support plate.

As the hydraulic tensioner 20 pulls on the through-bolt 12 and compresses the core 10, the displacement of the plunger 26, is measured and relayed to a user via a data acquisition system in real time electronically (not shown). Although the practice in the art is to use tensioners on all of, or almost all of, the through-bolts, the measuring device can but need not be used on every tensioner. The present invention may be used on only a single tensioner in the set. In particular embodiments, from 1 measuring device to 1 per through-bolt on both ends are used per core.

Figure 3:
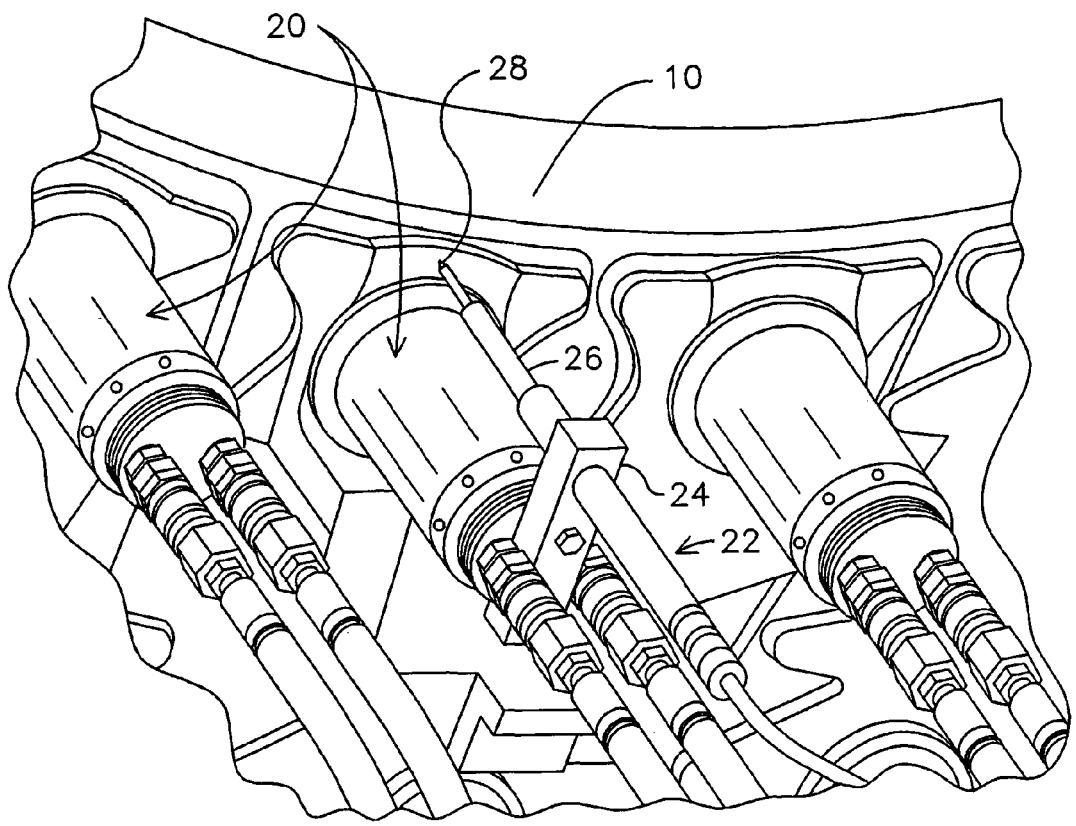
FIG. 3 illustrates another view of one embodiment of the present invention.

FIG. 3 illustrates an example of a measuring device 22, in this case another LVDT, being used on at most every other through-bolt. When less-than-one measuring device is used per through-bolt, optimal results are obtained when they are evenly spaced. When different measurements are taken at different points around the perimeter of the core, differences may be used in various fashions. For example, slight differences may be averaged. More extreme differences may be used to diagnose non-uniform compression.

When determining the existing compression on a stator core, a single cycle of compression with the tensioners is performed, and the measurement taken. The amount of compression achieved in that one cycle will indicate if the core is loose or tight by comparison to measurements on other stator cores. For example, if the core compresses 3 mm or more, then the core is fairly loose and additional cycles of compression will be required. If the core compresses less than 3 mm, then the core is fairly tight and will not require any further compression.

The same principal applies to newly stacked cores. Usually newly stacked cores are compressed during a loop heat consolidation process to compress the core. With every compression cycle, the core compresses less and less until a desired range of compression is achieved. In a loop heat consolidation heat and/or vibration is used to compress the core, but other methods known in the art may also be used.

Figure 4:
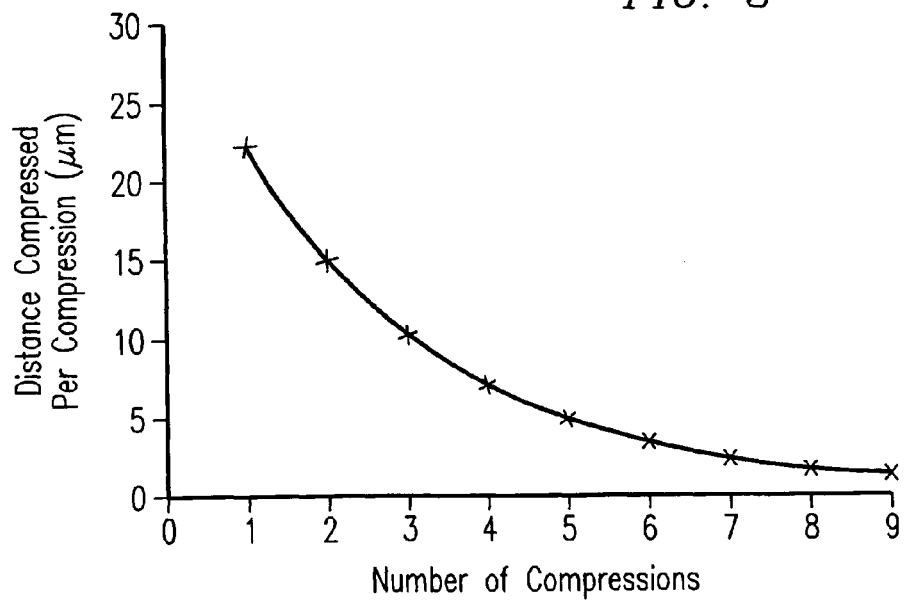
FIG. 4 shows a graph measurement that exemplifies the use of the present invention.

Referring to FIG. 4, a hypothetical graph gives a typical compression versus number of compressions. As is shown, after about 7 compression, the amount of compression achieved from each cycle is greatly diminished. Therefore, once this point is reached, a technician would know that the compression is complete. In addition to this, however, by taking accurate compression measurements, graphs like this may be plotted with only a few measurement points, as is known in the art. Therefore, with only a few measurement points, a predicted optimal number of compressions may be calculated in advance, and there would no longer be any extra compression cycles beyond this optimal number. In the prior art, many additional compressions had to be done due to lack of accurate measurements.

As discussed above, the amount of compression may be measured by subtracting the stretch of the through-bolt from the overall measurement. However, the present invention may also use the overall measurement to indicate if the core is loose or tight without subtracting the stretch of the through-bolt. If this technique is used, then the measurement needs to be compared to a pre-determined norm based on historical data from similar stator cores. However, when used in multiple measurement uses, the same principals discussed in reference to FIG. 4 may be used. In other words, the level at which diminished compression is achieved may be pre-determined and the number of compression cycles adjusted for accordingly.

In one embodiment the present invention provides for a method for measuring the compression of a stator core that comprises attaching a measuring device to a tensioner, placing the tensioner on an end of a through-bolt of the stator core, and performing at least one act of tensioning the stator core with the tensioner. Then measuring a compression state of the stator core by the measuring device registers determining the amount of relative compression achieved by the act of tensioning, the relative compression is the amount of actual compression of the core and the amount of stretch of the through-bolt. Finally determining an actual compression state of the stator core is based on the measuring.

In a related embodiment determining an actual compression state is performed by comparing the amount of relative compression to a pre-determined norm. Or determining an actual compression state is performed by obtaining further measurements to predict an optimal compression state and comparing the optimal compression state to the measurements. Or determining an actual compression state is performed by subtracting the stretch of the through-bolt from the measurement.

In another related embodiment the acts of tensioning and measuring may be performed multiple times. Also multiple measuring devices may be used, for example 4-8 measuring devices may be used per stator core. In particular embodiments the measuring device is an LVDT, and the tensioner is a hydraulic tensioner.

In another embodiment the present invention provides for a method for measuring the compression of a stator core that comprises attaching a LVDT measuring device to a hydraulic tensioner, placing the hydraulic tensioner on an end of a through-bolt of the stator core, and performing a series of tensioning steps to compress the stator core. Then measuring a relative compression of the stator core at each of the tensioning steps, the relative compression is the amount of actual compression of the core and the amount of stretch of the through-bolt. Finally then determining when the amount of relative compression has diminished and adjusting the number of steps in the tensioning steps.

In related embodiment determining when the amount of relative compression has diminished comprises actually measuring a diminished amount of compression, or predicting at what step a diminished amount of compression will be reached based on early measurements.

In still another embodiment the present invention provides for an apparatus for determining the compression of a stator core, that comprises a through-bolt, where the through-bolt is part of the stator core, a tensioner, where the tensioner is attached to the through-bolt, and a measuring device, where the measuring device is mounted to the through-bolt and in intimate contact with the stator core. The measuring device measures a relative compression of the stator core, the relative compression is the amount of actual compression of the core and the amount of stretch of the through-bolt. In related embodiments the tension is a hydraulic tensioner, and the measuring device is an LVDT.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A method for measuring the compression of a stator core comprising:
   attaching a LVDT measuring device to a hydraulic tensioner;
   placing said tensioner on an end of a through-bolt which extends past an end of said stator core;
   performing at least one act of compressing said stator core with said tensioner while simultaneously stretching said through-bolt which extends past said end of said stator core;
   measuring an amount of relative compression of the stator core achieved by said at least one act of compressing, wherein said relative compression is an amount of actual compression of the core and an amount of stretch of said through-bolt; and
   determining an actual compression state of said stator core based on the measured relative compression.

2. The method of claim 1, wherein determining an actual compression state is performed by comparing the amount of relative compression to a pre-determined norm.

3. The method of claim 1, wherein determining an actual compression state is performed by obtaining further measurements to predict an optimal compression state and comparing said optimal compression state to said measurements.

4. The method of claim 1, wherein determining an actual compression state is performed by subtracting the stretch of said through-bolt from the measurement.

5. The method of claim 1, wherein the acts of compressing and measuring are performed multiple times.

6. The method of claim 1, wherein 4-8 measuring devices are used per stator core.

7. A method for measuring the compression of a stator core comprising:
   attaching a LVDT measuring device to a hydraulic tensioner;
   placing said hydraulic tensioner on an end of a through-bolt of said stator core which extends past an end of said stator core;
   performing a series of tensioning steps to compress said stator core while simultaneously stretching said through-bolt which extends past said end of said stator core;
   measuring a relative compression of said stator core at each of said tensioning steps, wherein said relative compression is the amount of actual compression of the core and the amount of stretch of said through-bolt; and
   determining when the amount of relative compression has diminished and adjusting the number of steps in said tensioning steps.

8. The method of claim 7, wherein determining when the amount of relative compression has diminished comprises actually measuring a diminished amount of compression.

9. The method of claim 7, wherein determining when the amount of relative compression has diminished comprises predicting at what step a diminished amount of compression will be reached based on early measurements.

10. An apparatus for determining the compression of a stator core, comprising:
    a through-bolt, wherein said through-bolt is part of said stator core and extends past an end of said stator core;
    a tensioner, wherein said tensioner is attached to said through-bolt to compress said stator core while simultaneously stretching said through-bolt which extends past said stator core; and
    a measuring device, wherein said measuring device is mounted to said through-bolt and in intimate contact with said stator core;

wherein said measuring device measures a relative compression of said stator core, wherein said relative compression is the amount of actual compression of the core and the amount of stretch of said through-bolt.

11. The apparatus of claim 10, wherein said tension is a hydraulic tensioner.

12. The apparatus of claim 10, wherein said measuring device is an LVDT.

* * * * *